(12) United States Patent
Bensmann et al.

(10) Patent No.: US 11,840,337 B2
(45) Date of Patent: Dec. 12, 2023

(54) LEADING-EDGE ARRANGEMENT FOR AN AIRCRAFT

(71) Applicant: Airbus Operations GmbH, Hamburg (DE)

(72) Inventors: Stefan Bensmann, Hamburg (DE); Marcus Erban, Hamburg (DE); Martin Fees, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 45 days.

(21) Appl. No.: 17/425,264

(22) PCT Filed: Jun. 24, 2020

(86) PCT No.: PCT/EP2020/067704
§ 371 (c)(1),
(2) Date: Jul. 22, 2021

(87) PCT Pub. No.: WO2020/260391
PCT Pub. Date: Dec. 30, 2020

(65) Prior Publication Data
US 2022/0119094 A1    Apr. 21, 2022

(30) Foreign Application Priority Data

Jun. 27, 2019  (DE) .................... 102019117328.0

(51) Int. Cl.
*B64C 9/26* (2006.01)
*B64C 3/50* (2006.01)
*B64D 15/04* (2006.01)

(52) U.S. Cl.
CPC ............... *B64C 9/26* (2013.01); *B64C 3/50* (2013.01); *B64D 15/04* (2013.01)

(58) Field of Classification Search
CPC .... B64C 9/26; B64C 3/50; B64C 9/22; B64D 15/04; Y02T 50/40
See application file for complete search history.

(56) References Cited

U.S. PATENT DOCUMENTS 4,752,049 A * 6/1988 Cole ...................... B64D 15/04
                                                             244/134 B
5,865,400 A   2/1999 Pike et al.
(Continued)

FOREIGN PATENT DOCUMENTS

EP   3196123 A1 * 7/2017  ............... B64C 3/00
EP   3205580 A1 * 8/2017  ............. B64D 15/04
(Continued)

OTHER PUBLICATIONS

International Search Report; priority document.

*Primary Examiner* — Assres H Woldemaryam
(74) *Attorney, Agent, or Firm* — Greer, Burns & Crain, Ltd.

(57) ABSTRACT

A leading-edge arrangement for an aircraft is proposed, comprising a plurality of movable flow bodies, a supply duct, an air transfer duct, and at least one perforated tube. The movable flow bodies are arranged in a consecutive arrangement to form a row with a first end and a second end. The supply duct reaches into an interior of one of the flow bodies at the first end. The air transfer duct connects to the supply duct and extends at least through the interior of the respective flow body in the direction towards the second end. The at least one perforated tube is arranged inside at least one of the flow bodies that directly follows on. The at least one perforated tube is in fluid communication with the transfer duct. The transfer duct is configured to transfer air from the supply duct into the at least one perforated tube.

16 Claims, 2 Drawing Sheets

(56) References Cited

U.S. PATENT DOCUMENTS

| | | | | |
|---|---|---|---|---|
| 6,354,538 B1* | 3/2002 | Chilukuri | ............... | B64D 15/04 |
| | | | | 244/134 B |
| 2010/0176243 A1* | 7/2010 | Nieman | ................ | B64D 15/04 |
| | | | | 244/134 B |
| 2012/0187254 A1 | 7/2012 | Wollaston | | |
| 2013/0199218 A1* | 8/2013 | Scheibert | ................ | F25D 21/04 |
| | | | | 62/515 |
| 2017/0166313 A1* | 6/2017 | Saeed | .................... | B64D 33/02 |
| 2017/0217593 A1* | 8/2017 | Ishida | .................... | B64D 15/04 |
| 2019/0233126 A1 | 8/2019 | Poloni et al. | | |

FOREIGN PATENT DOCUMENTS

| | | | | |
|---|---|---|---|---|
| GB | 2586053 A * | 2/2021 | ............. | B64C 21/06 |
| WO | WO-2005113336 A1 * | 12/2005 | ........... | B64C 21/025 |
| WO | 2018005529 A1 | 1/2018 | | |

* cited by examiner

LEADING-EDGE ARRANGEMENT FOR AN AIRCRAFT

CROSS-REFERENCES TO RELATED APPLICATIONS

This application claims the benefit of the International Application No. PCT/EP2020/067704, filed on Jun. 24, 2020, and of the German patent application No. 102019117328.0 filed on Jun. 27, 2019, the entire disclosures of which are incorporated herein by way of reference.

FIELD OF THE INVENTION

The invention relates to a leading-edge arrangement for an aircraft, a wing having such a leading-edge arrangement as well as an aircraft having such a wing.

BACKGROUND OF THE INVENTION

In commercial aircraft, the icing of wing components and control surfaces is often prevented by using de-icing or anti-icing devices. A common approach to achieve this is to heat up respective parts with bleed air from turbofan engines. Usually, not all leading-edge components are equipped with de-icing or anti-icing devices. Instead, the components further outboard are heated up, while further inboard components remain unprotected. However, for routing bleed air having an elevated temperature into regions outboard of an engine installation position, a supply duct is installed partially in a fixed wing structure and extends from an engine to the first leading-edge component to be heated in an outboard direction. Thus, a part of the fixed wing needs to be equipped with thermal shielding devices to avoid an excessive heat transfer into sensitive components, such as mechanical structures, electrical cables and other conduits. This leads to completely bypassing a slat arranged between the engine installation position and the first slat to be heated.

SUMMARY OF THE INVENTION

It is an object of the invention to provide an alternate leading-edge arrangement, which has improved impact characteristics regarding manufacturing costs and shielding requirements for surrounding structures.

A leading-edge arrangement for an aircraft is proposed, comprising a plurality of movable flow bodies, a supply duct, an air transfer duct, and at least one perforated tube, wherein the movable flow bodies are arranged in a consecutive arrangement to form a row with a first end and a second end, wherein the supply duct reaches into an interior of one of the flow bodies at the first end, wherein the air transfer duct connects to the supply duct and extends at least through the interior of the respective flow body in the direction towards the second end, wherein the at least one perforated tube is arranged inside at least one of the flow bodies that directly follows on, wherein the at least one perforated tube is in fluid communication with the transfer duct, and wherein the transfer duct is configured to transfer air from the supply duct into the at least one perforated tube.

The movable flow bodies may particularly comprise leading edge devices, which are a part of a high lift system of an aircraft. They may exemplarily be realized as a leading-edge flap or a leading-edge slat. The invention focuses on aspects of an anti- or de-icing system and movable flow bodies that are to be equipped with an anti- or de-icing system may be considered. While some of the advantages or features are explained using a leading-edge device as an example, this does not rule out other kinds of flow bodies.

The flow bodies are configured to be movable components and may thus comprise flanges, brackets, holders, lugs, or similar features that allow to couple the flow bodies with appropriate drive devices. In some cases, the flow bodies may include ribs and/or spars, which may comprise a protruding section that allows to swivably couple a component to the respective flow body.

The plurality of movable flow bodies may comprise two, three, four, five or more flow bodies. They are configured to be positioned in a consecutive arrangement. They may each comprise at least one delimiting edge or face, wherein the delimiting edges or faces of the plurality of the flow bodies complement each other to form a leading edge or a part of a leading edge of a wing or to follow a general direction of a leading edge of a wing.

The flow bodies may be configured to be arrangeable in a flush manner next to each other. However, they may also enclose gaps between each other. This may depend on the desired application of the leading-edge arrangement according to the invention.

The supply duct acts as an interface to feed in air from an external device. As the at least one perforated tube is provided for ejecting air into an interior of at least a part of the flow bodies, it is beneficial to provide air having an elevated temperature. This may, for example, be provided by an engine of the aircraft, to which the arrangement according to the invention is to be mounted. For example, the respective engine or engines may each comprise at least one bleed air port, which is to be coupled with the supply duct. Between the bleed air port(s) and the supply duct, at least a valve and a restrictor may be provided, wherein the restrictor may be a part of the supply duct or it may be an external component.

It is desired that the supply duct ends as close to the first end of the arrangement as possible. Thus, its length may be greatly reduced in comparison with common supply ducts. By integrating the air transfer duct into the flow body at the first end, air that is supplied through the supply duct can be transferred through the transfer duct to the at least one perforated tube, which may be placed in an adjacent flow body that is not directly placed at the first end.

Since the air transfer duct extends at least through the interior of the respective flow body, into which the supply duct reaches, air is only forwarded through the respective flow body. Hence, the respective flow body directly at the first end merely acts as a feature for holding the transfer duct.

The air transfer duct may comprise a thermal insulation to avoid loss of thermal energy during the transfer of the air to the at least one perforated tube. Since substantially no other installations to be protected from heat are provided in the flow body at the first end, the insulation may be realized in a more simple fashion than with the supply duct.

For example, the first flow body may be a leading edge device that is not equipped with an anti-icing or de-icing feature. However, by including an air transfer duct into the flow body at the first side, the supply duct may be realized with an as short length as possible. By including the air transfer duct into the flow body, a hollow space that usually remains substantially unused for other purposes now acts for transferring the air at an elevated temperature to the flow bodies that require anti- or de-icing. Other spaces, to which the leading-edge arrangement may be attached, do not need to carry the supply duct and thus, the requirements for an integration of the supply duct are reduced. For example, in common installations different conduits, electrical lines or other elements may be arranged in a fixed wing component, to which the leading-edge arrangement is to be attached. By reducing the length of the supply duct and transferring the air inside the flow body at the first end, less heat and mechanical shielding measures need to be provided in the fixed wing component. Since the flow body usually does not comprise these sensitive conduits and lines, a greatly reduced thermal and mechanical shielding is required. In turn, this leads to reduced manufacturing costs and effort as well as to a reduced weight, while at least maintaining the same level of safety and reliability.

In a preferred embodiment, the at least one perforated tube is a piccolo tube configured to eject air to form a thermal anti- or de-icing device. The piccolo tube may comprise perforations that are arranged on at least a part of a peripheral surface. The perforations may be arranged in lines or staggered. However, they geometrical extent of the perforations may be limited to a certain angular range of the peripheral surface. This angular range may be adapted to the shape of the flow bodies, such that air is ejected to impinge on interior surfaces of the flow bodies that need to be heated for the desired anti- or de-icing effect. The angular range may exemplarily include angles of 75 to 150 degrees. The angular range may be greater or smaller, if desired. Preferably, the piccolo tube is made from a metallic material.

In another advantageous embodiment, the supply duct is configured to route bleed air from an aircraft engine to the air transfer duct and the at least one piccolo tube. The supply duct may thus comprise a sufficient thermal insulation to avoid an excessive temperature at its peripheral surface. Brackets and holders for attaching the supply duct may be provided with a sufficient thermal de-coupling as well. The supply duct may include a plurality of bends to be configured to route bleed air, e.g., from a nacelle of an engine into the region of the first end.

Furthermore, the flow bodies may each comprise a forward end and a rear end, wherein the supply duct extends through the rear end of the flow body at the first end. The forward end may comprise a leading edge of the flow body, at least in an extended state of the flow body, wherein the leading edge may, in particular, be arranged on a curved surface. The shape of the rear end heavily depends on the kind of flow body. While the rear end may comprise a low height and is merely realized in the form of an elongated edge, it may also comprise a flat or curved surface that may be indented in the direction of the forward end. The supply duct extends into the rear end preferably in cases where the flow body will be moved with a distinct translational motion to increase the distance between the rear end of the flow body and the part to which it is movably attached. By providing the supply duct to extend through the rear end it may easily follow the movement of the flow body by using a telescopic duct section that is extended or retracted during the movement of the flow body.

Consequently, it is preferred if the supply duct comprises a telescopic duct section extending through the rear end of the flow body that is arranged at the first end, wherein the telescopic duct section is in fluid communication with an angular connector, which connects to the air transfer duct. The angular connector may bend from a chordwise into a spanwise direction of the respective flow body.

In an advantageous embodiment, the air transfer duct extends into at least two flow bodies. While it is mentioned above that the air transfer duct may be arranged in the flow body directly at the first end, it may also be possible to let it extend into a directly adjacent, i.e., consecutive, flow body. To avoid a canting of the air transfer duct, it may comprise an elastic coupling to be arranged between the adjacent flow bodies. The elastic coupling may exemplarily comprise a bellows arrangement.

In a preferred embodiment, the air transfer duct is coupled with the at least one piccolo tube in the interior of one of the flow bodies. Consequently, the air transfer duct may reach into a flow body, which is to be equipped with an anti-icing or de-icing function. The air transfer duct may exemplarily just reach into the interior of the respective flow body or it may extend further into the interior. Thus, it may be possible to reduce the length of the piccolo tube in the respective flow body to reduce the anti- or de-icing effect.

In another advantageous embodiment, the air transfer duct is coupled with the at least one piccolo tube between two adjacent flow bodies. The coupling may include an elastic coupling that is configured to compensate a relative motion between the adjacent flow bodies. By providing the coupling between adjacent flow bodies, a maximum length of the piccolo tube inside the flow body is possible.

Still further, a section of 10 to 75 percent and preferably of 25 to 50 percent of a length of the air transfer duct comprises perforations to eject air that is transferred by the air transfer duct. Thus, also the air transfer duct may provide an anti-icing or de-icing function at least in a section of the respective flow body.

Preferably, the perforations of the air transfer duct are arranged at a side of the respective flow body that faces away from the first end. Thus, a section near the consecutive flow body can be subjected to an anti-icing or de-icing function.

In an advantageous embodiment, a transition section in the interior of one of the flow bodies connects one of the at least one perforated tube and the air transfer duct. The transition section can be a rigidly or elastically coupled element. The transition section may comprise the same or a different diameter as the at least one perforated tube. In a simple embodiment, it may be made from a plastic material or a metallic material that withstands the expected temperature.

Still further, the flow bodies may be leading-edge high lift devices. As explained above, they may particularly be realized as leading-edge slats, leading-edge flaps or droop nose devices.

The invention further relates to a wing having a fixed wing component and a leading-edge arrangement according to the above description, wherein the flow bodies of the leading-edge arrangement are movably supported on the fixed wing component, and wherein the supply duct extends through a section of the fixed wing component.

In an exemplary embodiment of the wing, the flow bodies comprise at least one of a leading-edge slat and of a droop nose device.

Still further, the invention relates to an aircraft having two wings according to the above, as well as engines attached to the wings, wherein the supply duct of each wing extends from an engine to the leading-edge arrangement. The engines may be turbofan or turboprop engines that are attached to an underside or a top side of the wings. It is clear that the supply duct explained further above extends from at least one compressor stage to the first side of the arrangement according to the invention. For avoiding excessive air temperatures, upstream of the supply duct a heat exchanger may be provided that is configured to dissipate heat from the bleed air to the environment.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
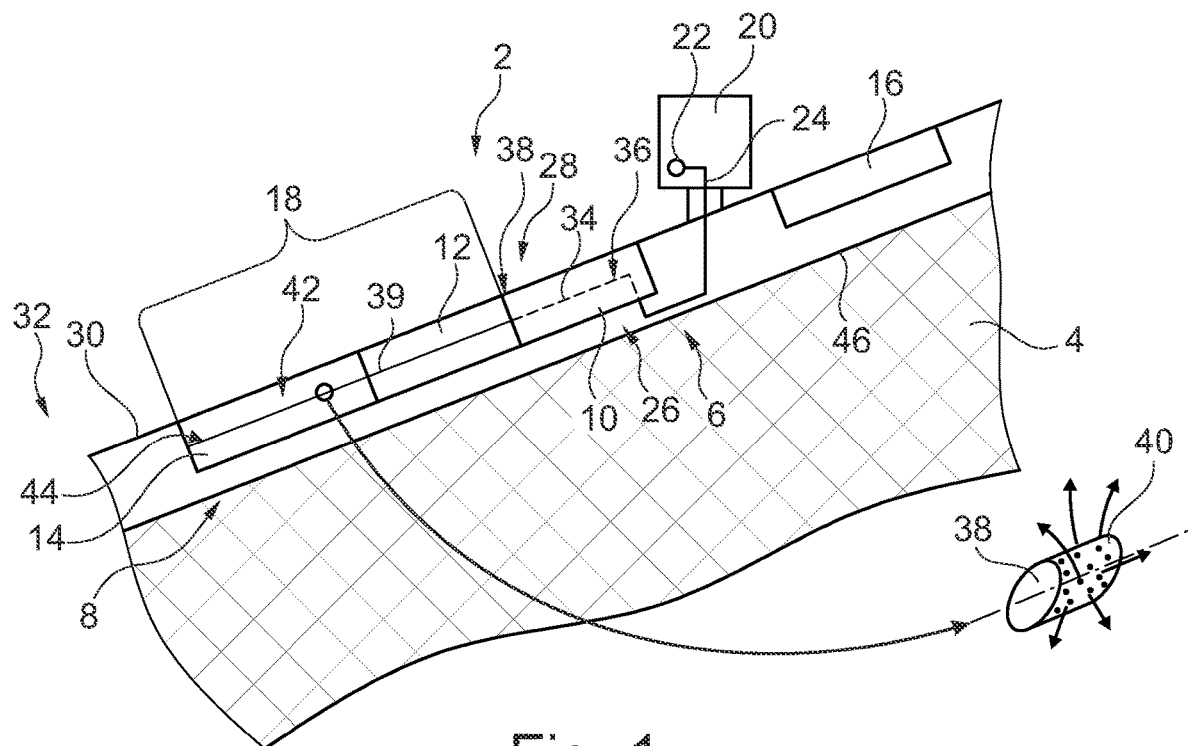
FIG. 1 shows a first exemplary embodiment of a leading-edge arrangement in a schematic view.

FIG. 1 shows a leading-edge arrangement 2, which is attached to a fixed wing component 4 of a wing 32 of an aircraft. It is noted that the shown setup of the arrangement 2 is not to scale and merely acts as an exemplary illustration. Also, the arrangement 2 shows a certain type of components, which may also be replaced by components of a completely different type.

The arrangement 2 comprises a first end 6 and a second end 8, wherein flow bodies 10, 12 and 14 form a consecutive arrangement in the form of a row. Still further, there is a further inboard flow body 16, which is not of particular relevance in the following description. The flow body 10, which is directly arranged at the first end 6 is referred to as a first flow body 10, while the consecutive flow body 12 is named second flow body 12 and the further consecutive flow body 14 is named third flow body 14. The second and third flow bodies 12 and 14 provide a de-iced group 18, which are actively provided with hot air for anti- or de-icing, while the first flow body 10 remains without any icing protection. In the example, all flow bodies 10, 12, 14 (and 16) are realized as leading-edge slats. They are coupled with drive devices (not shown), such that they can be brought into extended positions and into a retracted position shown in FIG. 1.

An engine 20 is arranged underneath the fixed wing component 4. It may be realized in the form of a turbofan engine, which comprises at least one bleed air port 22. Here, air is tapped from at least one compressor stage and delivered into a supply duct 24. The supply duct 24 extends from the engine 20 into the direction of the first end 6.

The first flow body 10, the second flow body 12 and the third flow body 14 each comprise a rear end 26 and a forward end 28. The forward end 28 of the flow bodies 10, 12 and 14 follow a direction of a leading edge 30 of the wing 32, to which the arrangement 2, as well as the fixed wing component 4, are associated. The supply duct 24 is routed into the first flow body 10 through the rear end 26 as close to the first end 6 as possible. Consequently, the length of the supply duct 24 is as short as possible. Inside the first flow body 10, an air transfer duct 34 is arranged. It is in fluid communication with the supply duct 24 and exemplarily comprises an angular connector 36, such that the direction of flow coming from the supply duct 24 and running into the air transfer duct 34 is bent about roughly 90°.

Air supplied by the supply duct 24 is thus transferred completely through the first flow body 10, without any interaction with the first flow body 10. Then, at a transition 38 between the first flow body 10 and the second flow body 12, a piccolo tube 39 is attached to the air transfer duct 34. The piccolo tube 39, which is a perforated tube, allows air to be ejected through perforations 40 into an interior 42 of the respective flow bodies 12 and 14. Thus, a skin 44 of the flow bodies 12 and 14 is heated up, which effects an anti- or deicing function.

By reducing the length of the supply duct 24 as much as possible, the installation and required shielding effort for the air supply duct 24 is minimized. Fewer geometrical regions of the fixed wing component 4 and therefore fewer electrical lines and conduits inside the fixed wing component 4 need to be protected from heat emanating from the supply duct 24. The first flow body 10 hardly encloses other installation features, such that the air transfer duct 34 may not require an as sophisticated thermal shielding as the supply duct 24. Hence, routing the supply duct 24 around the first flow body 10 to reach into the second flow body 12, as commonly found in commercial aircraft, is not required. Also, a forward spar 46 of the fixed wing component 4 is less exposed to heat during an anti- or de-icing time interval.

Figure 2:
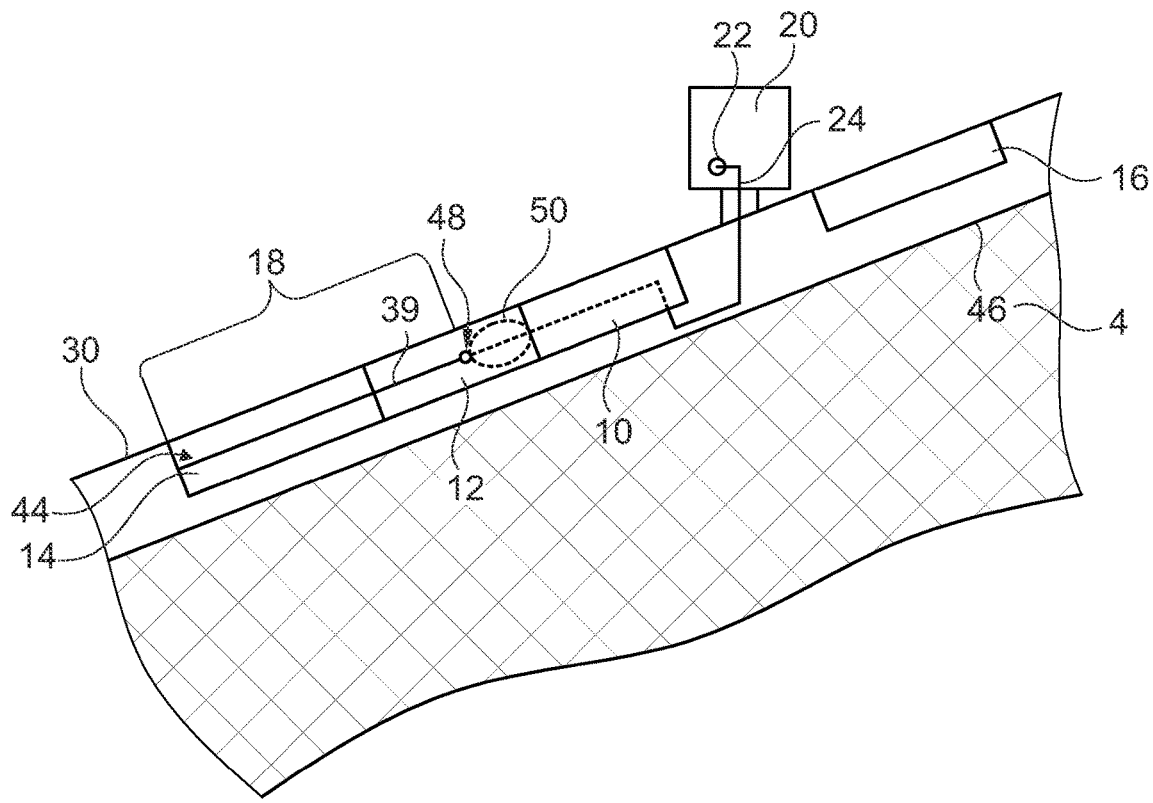
FIG. 2 shows a second exemplary embodiment of a leading-edge arrangement in a schematic view.

As demonstrated in FIG. 2, the air transfer duct 34 may also extend further into the second flow body 12 in order to reduce the length of the anti- or deiced group 18. The air transfer duct 34 may exemplarily reach to a transition section 48 inside the second flow body 12. However, it may also be possible to let the air transfer duct 34 reach completely through the first and second flow bodies 10 and 12 and perforate a part of the air transfer duct 34 that corresponds to the distance between the transition region 48 and the outboard delimitation of the second flow body 12 as shown in FIG. 2. Thus, there is an unperforated inboard region 50 inside the second flow body 12.

Figure 3:
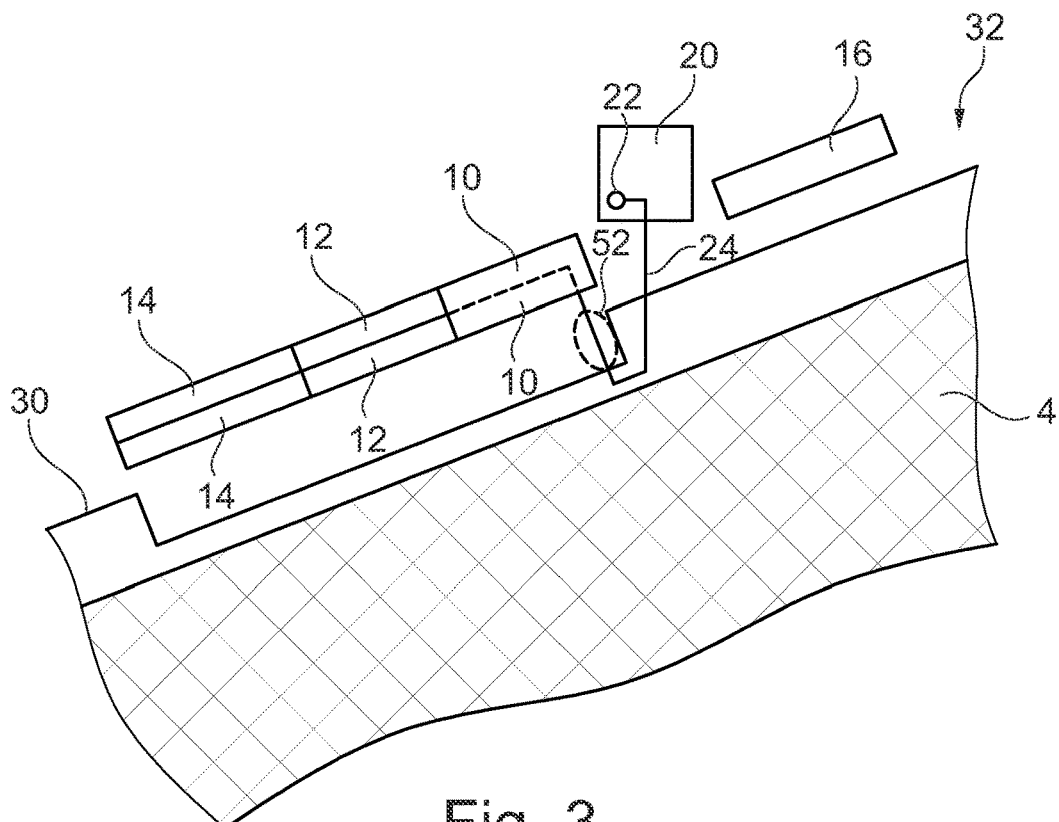
FIG. 3 shows the leading-edge arrangement with extended flow bodies.

FIG. 3 demonstrates the first, second and third flow bodies 10, 12 and 14 in extended positions. Here, for transferring the air from the supply duct 24 into the air transfer duct 34, a telescopic duct section 52 is provided, which follows the motion of the first flow body 10.

Figure 4:
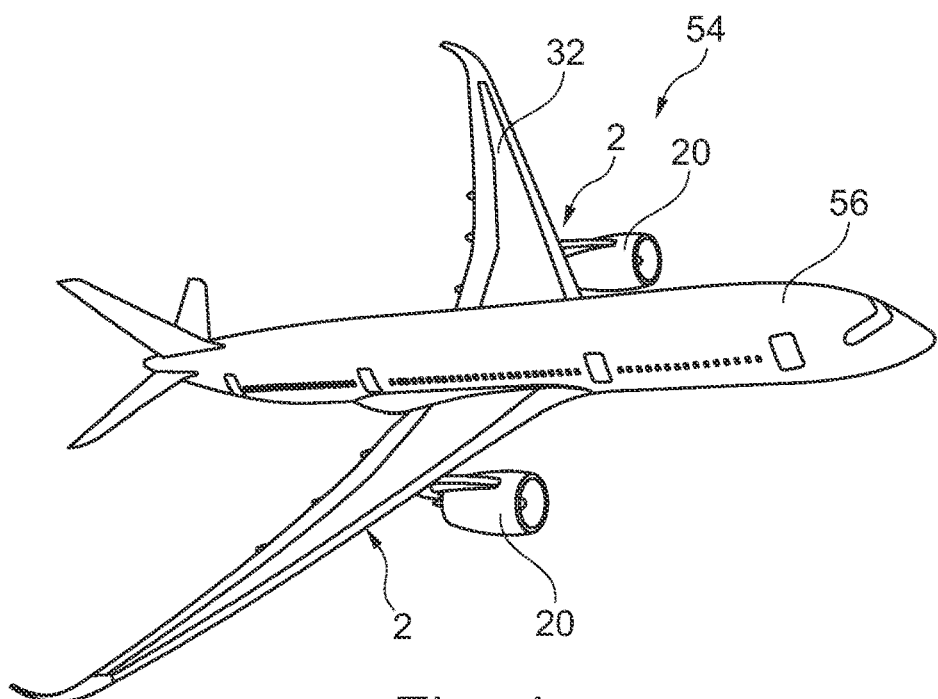
FIG. 4 shows an aircraft.

Finally, FIG. 4 shows an aircraft 54 having a fuselage 56, wings 32 and at least one leading-edge arrangement 2 provided on the wings 32. Exemplarily, the aircraft 54 comprises two engines 20, which are realized as turbofan engines. These often comprise two or more bleed air ports, which are connectable to the supply duct 24.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. This disclosure hereby incorporates by reference the complete disclosure of any patent or application from which it claims benefit or priority.

REFERENCE NUMERALS 2 leading-edge arrangement
4 fixed wing component
6 first end
8 second end 10 first flow body
12 second flow body
14 third flow body
16 inboard flow body
18 de-iced group
20 engine
22 bleed air port
24 supply duct
26 rear end
28 forward end
30 leading-edge
32 wing
34 air transfer duct
36 angular connector
38 transition
39 perforated tube/piccolo tube
40 perforation
42 interior
44 skin
46 front spar
48 transition section
50 unperforated inboard region
52 telescopic duct section
54 aircraft
56 fuselage

The invention claimed is:

1. A leading-edge arrangement for an aircraft, comprising:
a plurality of movable flow bodies,
a supply duct,
an air transfer duct, and
at least one perforated tube,
wherein the movable flow bodies are arranged in a consecutive arrangement to form a row with a first end and a second end,
wherein the supply duct reaches into an interior of a first flow body at the first end,
wherein the air transfer duct connects to the supply duct and extends at least through the interior of the first flow body in a direction towards the second end,
wherein the air transfer duct is unperforated within the first flow body,
wherein the at least one perforated tube is arranged inside at least one of the flow bodies that directly follows from the first flow body,
wherein the at least one perforated tube is in fluid communication with the air transfer duct, and
wherein the air transfer duct is configured to transfer air from the supply duct into the at least one perforated tube.

2. The leading-edge arrangement according to claim 1, wherein the at least one perforated tube is a piccolo tube configured to eject air to form a thermal anti- or de-icing device.

3. The leading-edge arrangement according to claim 1, wherein the supply duct is configured to route bleed air from an aircraft engine to the air transfer duct and the at least one piccolo tube.

4. The leading-edge arrangement according to claim 1,
wherein the flow bodies each comprise a forward end and a rear end, and
wherein the supply duct extends through the rear end of the first flow body at the first end.

5. The leading-edge arrangement according to claim 4,
wherein the supply duct comprises a telescopic duct section extending through the rear end of the first flow body that is arranged at the first end, and
wherein the telescopic duct section is in fluid communication with an angular connector, which connects to the air transfer duct.

6. The leading-edge arrangement according to claim 1, wherein the air transfer duct extends into at least two flow bodies.

7. The leading-edge arrangement according to claim 1, wherein the air transfer duct is coupled with the at least one piccolo tube in the interior of one of the flow bodies.

8. The leading-edge arrangement according to claim 1, wherein the air transfer duct is coupled with the at least one piccolo tube between two adjacent flow bodies.

9. The leading-edge arrangement according to claim 1, wherein a section of 10 to 75 percent of a length of the air transfer duct comprises perforations to eject air that is transferred by the air transfer duct.

10. The leading-edge arrangement according to claim 9, wherein the section comprising perforations comprises 25 to 50 percent of the length of the air transfer duct.

11. The leading-edge arrangement according to claim 9,
wherein the perforations of the air transfer duct are arranged at a side of the respective flow body that faces away from the first end.

12. The leading-edge arrangement according to claim 1, wherein a transition section in the interior of one of the flow bodies connects one of the at least one perforated tube and the air transfer duct.

13. The leading-edge arrangement according to claim 1, wherein the flow bodies are leading-edge high lift devices.

14. A wing having a fixed wing component and a leading-edge arrangement according to claim 1,
wherein the flow bodies of the leading-edge arrangement are movably supported on the fixed wing component, and
wherein the supply duct extends through a section of the fixed wing component.

15. The wing according to claim 14, wherein the flow bodies comprise at least one of a leading-edge slat and of a droop nose device.

16. An aircraft having two wings according to claim 14, and engines attached to the wings, wherein the supply duct of each wing extends from an engine to the leading-edge arrangement.

* * * * *